United States Patent [19]

Kawano et al.

[11] Patent Number: 4,790,217
[45] Date of Patent: Dec. 13, 1988

[54] LINE PRESSURE CONTROL SYSTEM FOR AUTOMATIC TRANSMISSION

[75] Inventors: Toru Kawano; Hidehiko Mishima, both of Hiroshima, Japan

[73] Assignee: Mazda Motor Corporation, Japan

[21] Appl. No.: 894,277

[22] Filed: Aug. 7, 1986

[30] Foreign Application Priority Data

Aug. 8, 1985 [JP] Japan .............................. 60-174794

[51] Int. Cl.$^4$ .............................................. B60K 41/06
[52] U.S. Cl. ............................................ 74/868; 74/869
[58] Field of Search ........................... 74/867, 868, 869

[56] References Cited

U.S. PATENT DOCUMENTS

| | | | |
|---|---|---|---|
| 3,561,295 | 2/1971 | Iijima | 74/869 |
| 3,683,721 | 8/1972 | Vozumi et al. | 74/868 X |
| 3,895,542 | 7/1975 | Miyauchi | 74/869 X |
| 4,136,584 | 1/1979 | Ishikawa | 74/867 |
| 4,291,596 | 9/1981 | Sakakibara | 74/868 X |
| 4,313,354 | 2/1982 | Iwanaga et al. | 74/868 X |
| 4,418,587 | 12/1983 | Kauffman | 74/867 |
| 4,559,850 | 12/1985 | Sakakibara | 74/868 |
| 4,573,375 | 3/1986 | Hamada et al. | 74/867 X |
| 4,598,612 | 7/1986 | Ideta | 74/867 |
| 4,665,776 | 5/1987 | Sugano | 74/867 |

Primary Examiner—Lawrence Staab
Assistant Examiner—Dwight G. Diehl
Attorney, Agent, or Firm—Gerald J. Ferguson, Jr.

[57] ABSTRACT

An automatic transmission has a transmission gear mechanism for transmitting the engine output power by way of a plurality of power transmission paths, and friction engagement elements which are operated by a line pressure from a control valve to change the power transmission path through the transmission gear mechanism. Feed of the line pressure is controlled by a throttle pressure corresponding to the engine load and a governor pressure corresponding to the output speed of the transmission gear mechanism to effect gear shifting. A line pressure control system for controlling the line pressure comprises a regulator valve for regulating the line pressure, and a throttle modulator valve for determining a throttle modulator pressure for controlling the regulator valve according to the governor pressure and the throttle pressure so that the line pressure is increased with increase of the throttle pressure and is lowered with increase of the output speed of the transmission gear mechanism.

13 Claims, 4 Drawing Sheets

FULL THROTTLE — THROTTLE OPENING — FULL CLOSURE

GOVERNOR PRESSURE (Pg)

LINE PRESSURE CONTROL SYSTEM FOR AUTOMATIC TRANSMISSION

BACKGROUND OF THE INVENTION

1. Field of the Invention

This invention relates to a line pressure control system for controlling line pressure to clutches and brakes for changing driving force transmission path in an automatic transmission, and more particularly to a line pressure control system in which line pressure to clutches and brakes is controlled according to the throttle opening and the transmission output speed.

2. Description of the Prior Art

Typical conventional automatic transmissions for a vehicle comprises a torque converter and a multispeed transmission gear mechanism. The multispeed transmission gear mechanism includes a plurality of gear trains, and the driving force is transmitted through a desired gear train by selectively operating a brake and a clutch associated with the desired gear train. The brakes and clutches associated with the respective gear trains are operated by line pressure fed from a control valve.

In such automatic transmissions, if the line pressure is excessively low, the torque capacities of the brakes and clutches are reduced to give rise to slip of the brakes and clutches, and accordingly, the line pressure must be kept higher than a predetermined value. On the other hand, if the line pressure is excessively high, the torque capacities of the brakes and clutches become excessively high so that the brakes and clutches abruptly engage to produce torque shock. Further, excessively high line pressure is not preferred since larger power is consumed.

Accordingly, it is preferred that the line pressure be kept at a value at which a minimum torque capacity sufficient for the brakes and clutches to engage can be obtained. The minimum and sufficient torque capacity changes with the output torque of the torque converter. In Japanese Patent Publication No. 47(1972)-32329, there is disclosed a line pressure control system in which the output torque of the torque converter (turbine torque) is detected and a line pressure substantially proportional to the output torque is generated by an electric-hydraulic pressure servo-valve.

However, this line pressure control system is disadvantageous in that a calculating circuit for detecting the output torque of the torque converter and the electric-hydraulic pressure servo-valve for generating a line pressure substantially proportional to the output torque are necessary, and accordingly the system is complicated and the manufacturing cost is increased.

SUMMARY OF THE INVENTION

In view of the foregoing observations and description, the primary object of the present invention is to provide a line pressure control system in which the line pressure can be precisely controlled to a value at which minimum torque capacities sufficient for the brakes and clutches to engage can be obtained without complicating the structure and without adding to the manufacturing cost.

In accordance with the present invention, there is provided a line pressure control system for an automatic transmission which has a transmission gear mechanism for transmitting the engine output power by way of a plurality of power transmission paths, and friction engagement elements which are operated by a line pressure from a control valve to change the power transmission path through the transmission gear mechanism, and in which the feed of the line pressure is controlled by a throttle pressure corresponding to the engine load and a governor pressure corresponding to the output speed of the transmission gear mechanism to effect gear shifting, the line pressure control system comprising a regulator valve for regulating the line pressure, and a throttle modulator valve for determining a throttle modulator pressure for controlling the regulator valve according to the governor pressure and the throttle pressure so that the line pressure is increased with increase of the throttle pressure and is lowered with increase of the output speed of the transmission gear mechanism.

DESCRIPTION OF THE PREFERRED EMBODIMENT

Mechanism of transmission

Figure 1:
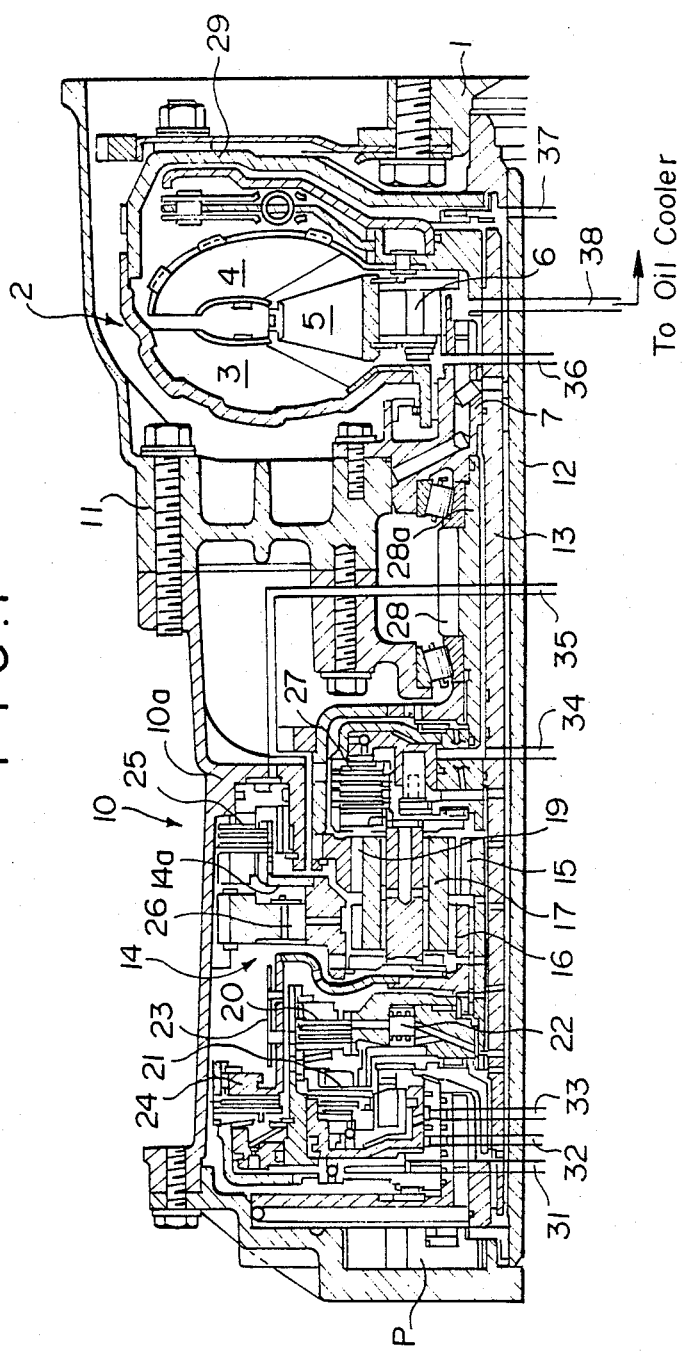
FIG. 1 is a cross-sectional view showing an automatic transmission provided with a line pressure control system in accordance with an embodiment of the present invention.

In FIG. 1, a flywheel 1 is attached to the output shaft of an engine integrally therewith. A torque converter 2 and a multispeed transmission gear mechanism 10 are disposed coaxially with the flywheel 1. The torque converter 2 comprises a pump 3, a turbine 4 and a stator 5. The pump 3 is fixed to the flywheel 1, and stator 5 is mounted, by way of a one-way clutch 6, for rotation on a fixed shaft 7 integrally formed with a casing 11 of the torque converter 2. The one-way clutch 6 permits rotation of the stator 5 in the same direction as the direction of rotation of the pump 3 but inhibits rotation of the stator 5 in the reverse direction.

The transmission gear mechanism 10 has a central shaft 12 extending through the transmission gear mechanism 10 at the center thereof. One end of the central shaft 12 is fixed to the flywheel 1, and the other end of the central shaft 12 is drivingly connected to an oil pump P mounted on a side wall of the transmission gear mechanism 10. A hollow turbine shaft 13 extends on the outer side of the central shaft 12. One end of the turbine shaft 13 is connected to the turbine 4 of the torque converter 2 and the other end of the turbine shaft 13 is supported for rotation on the side wall of the transmission gear mechanism 10. A Ravineawx type planetary gear unit 14 is provided on the turbine shaft 13. The planetary gear unit 14 comprises a small sun gear 15, a large sun gear 16 disposed on the side of the small sun gear 15 remote from the engine, a long pinion gear 17, a short pinion gear 18 (not shown) in mesh with the small sun gear 15 and the long pinion gear 17, and a ring gear 19. On the side of the planetary gear unit 14 remote from the engine, there are disposed first and second clutch mechanisms 20 and 21 side by side. The first clutch mechanism 20 is for forward movement, and controls power transmission between the small sun gear 15 and the turbine shaft 13 by a first one way clutch 22. The second clutch mechanism 21 controls power transmission between the small sun gear 15 and the turbine shaft 13 in parallel to the first clutch mechanism 20. A first brake mechanism 23 is disposed radially outside of the second clutch mechanism 21. The first brake mechanism 23 is a band brake, and comprises a brake drum 16 connected to the large sun gear 16 and a brake band positioned around the brake drum. A third clutch mechanism 24 is disposed radially outside of the first clutch mechanism 20 and beside the first brake mechanism 23. The third clutch mechanism 24 is for reverse, and controls power transmission between the large sun gear 16 and the turbine shaft 13 by way of the brake drum of the first brake mechanism 23.

Radially outside of the planetary gear unit 14 is disposed a second brake mechanism 25 for controlling engagement of a carrier 14a of the planetary gear unit 14 with a casing 10a of the transmission gear mechanism 10. Between the first and second brake mechanisms 23 and 25 is disposed a second one-way clutch 26 for controlling engagement of a carrier 14a of the planetary gear unit 14 with a casing 10a of the transmission gear mechanism 10 in parallel to the second brake mechanism 25. On the engine side of the planetary gear unit 14 is disposed a fourth clutch mechanism 27 for controlling power transmission between the carrier 14a of the planetary gear unit 14 and the turbine shaft 13. On the engine side of the fourth clutch mechanism 27 is disposed an output gear 28 connected to the ring gear 19. The output gear 28 is attached to an output shaft 28a. Reference numeral 29 denotes a lockup clutch for directly connecting the turbine shaft 13 with the crankshaft.

The multispeed transmission gear mechanism 10 has four forward speeds and a reverse, and a desired gear speed can be obtained by selectively applying the first to fourth clutch mechanisms 20, 21, 24 and 27, and the first and second brake mechanisms 23 and 25 by line pressure fed thereto through hydraulic pressure lines 31 to 35. The relation between the application of the brake mechanisms and the clutch mechanism and the gear speeds is shown in the following table.

|  | clutch | | | | brake | | one-way clutch | |
| --- | --- | --- | --- | --- | --- | --- | --- | --- |
|  | 24 | 20 | 21 | 27 | 25 | 23 | 26 | 22 |
| P |  |  |  |  |  |  |  |  |
| R | o |  |  |  | o |  |  |  |
| N |  |  |  |  |  |  |  |  |
| D range |  |  |  |  |  |  |  |  |
| 1st |  | o |  |  |  |  | (o) | (o) |
| 2nd |  | o |  |  |  | o |  | (o) |
| 3rd |  | o | o | o |  |  |  | (o) |
| OD |  | o |  | o |  | o |  |  |
| 2 range |  |  |  |  |  |  |  |  |
| 1st |  |  |  |  |  |  |  |  |
| 2nd |  | o | o |  |  | o |  | (o) |
| 3rd |  | o | o | o |  |  |  | (o) |
| 1 range |  |  |  |  |  |  |  |  |
| 1st |  | o | o |  | o |  | (o) | (o) |
| 2nd |  | o | o |  |  | o |  | (o) |

*o represents that the clutch or the brake is applied, and (o) represents that the one-way clutch transmits the power only in the designated direction.

Hydraulic Control Circuit

The hydraulic control circuit for supplying the line pressure to the clutches and brakes will be described with reference to FIG. 2, hereinbelow.

The hydraulic control circuit 50 includes a plurality of valves to be described later, and the valves are selectively operated to selectively feed and remove hydraulic pressure to and from the first to fourth clutch mechanisms 20, 21, 24 and 27 and the first and second brake mechanisms 23 and 25 through the hydraulic pressure lines 31 to 35 depending on the gear speed to be obtained.

The pressure of working oil discharged from the pump P (driven by the engine by way of the central shaft 12) to a pressure line 101 is regulated to a predetermined line pressure Pln by a regulator valve 51 which is actuated according to throttle modulator pressure Psm from a line 102 and backup pressure from a line 103. The line pressure Pln is supplied to a port 52a of a manual shift valve 52 by way of the line 101. The manual shift valve 52 is operated by a selector lever and is moved to a position in which the port 52a is communicated with one of discharge ports of the manual shift lever depending on the range selected by the selector lever.

The throttle modulator pressure Psm is regulated by a throttle modulator valve 65. That is, a governor pressure Pg from a governor valve 79 which generates a hydraulic pressure corresponding to the transmission output speed and a throttle pressure Pth from a throttle control valve 64 which generates a hydraulic pressure corresponding to the throttle opening act on the throttle modulator valve 65 by way of lines 104 and 105, and the throttle modulator pressure Psm is determined by the governor pressure Pg and the throttle pressure Pth.

Figure 3:
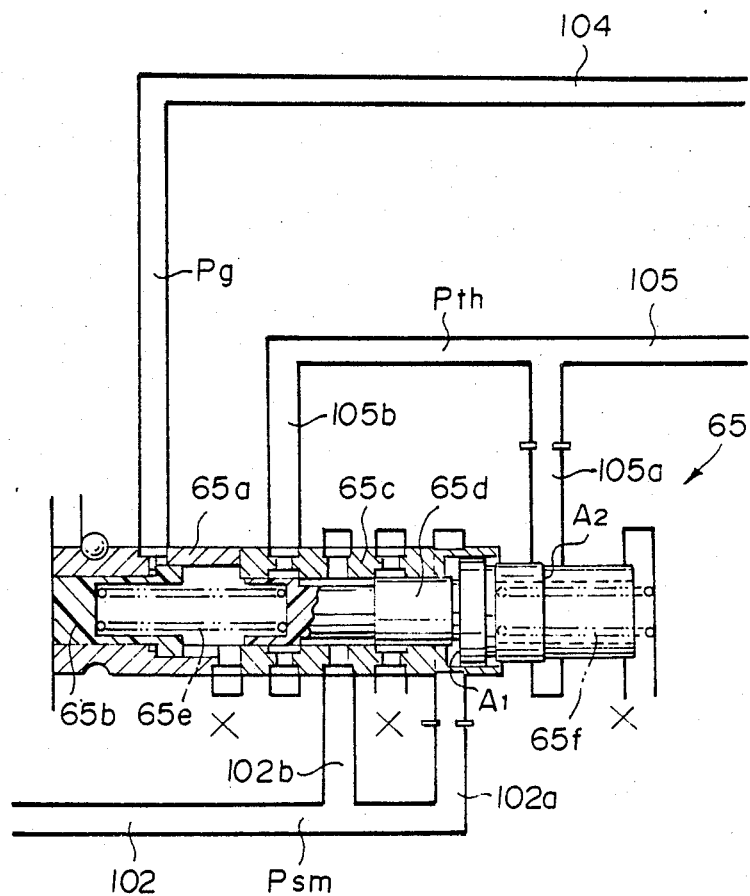
FIG. 3 is an enlarged cross-sectional view of the throttle modulator valve.

The operation of the throttle modulator valve 65 will be described in detail with reference to FIGS. 3 to 5. As shown in FIG. 3, the throttle modulator valve 65 comprises a first spool 65b slidably received in a first sleeve 65a, a second spool 65d slidably received in a second sleeve 65c, a first spring 65e positioned between the first and second spools 65b and 65d, and a second spring 65f for urging the second spool 65d leftward as seen in FIG. 3. It is first assumed that the governor pressure Pg is 0. In this case, the second spool 65d is forced leftward since the force F1 of the first spring 65e is weaker than the force F2 of the second spring 65f, and a line 105b and a line 102b are communicated with each other by way of a groove on the second spool 65d, whereby the throttle pressure Pth fed to the line 105 is transmitted to the line 102 as it is. Accordingly, the throttle modulator pressure Psm is equal to the throttle pressure Pth. The second spool 65d has first and second pressure receiving portions A1 and A2. The throttle pressure Pth in the line 105 acts on the second pressure receiving portion A2 by way of a line 105a to urge the second spool 65d leftward. On the other hand, the throttle modulator pressure Psm in the line 102 acts on the first pressure receiving portion A1 by way of a line 102a to urge the second spool 65d rightward. Further, the area of the first pressure receiving portion A1 is larger than that of the second pressure receiving portion A2. Accordingly, when the throttle pressure Pth exceeds a predetermined value, the second spool 65d is moved rightward and the relation between the throttle modulator pressure Psm and the throttle pressure Pth becomes as represented by the following formula.

$$Psm \times A1 = Pth \times A2 + (F2 - F1)$$

Figure 4:
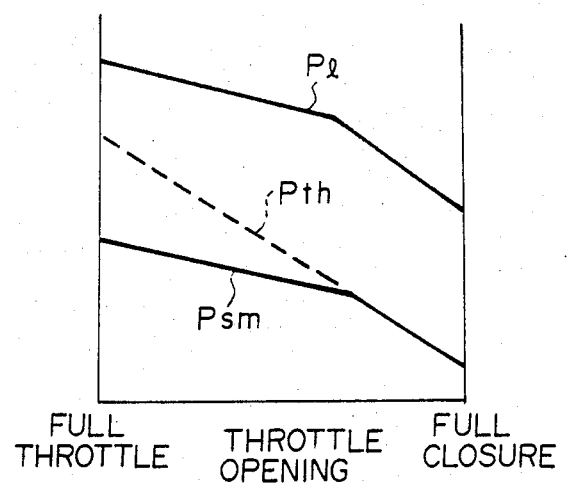
FIGS. 4 and 5 are views for illustrating the operation of the throttle modulator valve.
Figure 5:
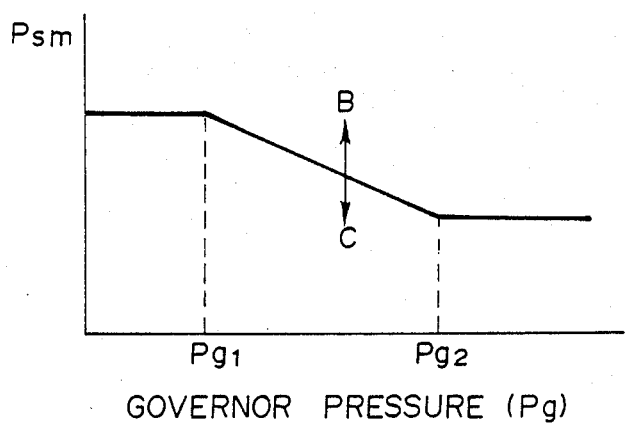

The relation between the throttle modulator pressure Psm and the throttle pressure Pth is shown in FIG. 4. As can be seen from FIG. 4, the throttle pressure Pth increases in proportion to increase of the throttle opening, and the throttle modulator pressure Psm is equal to the throttle pressure Pth in the range in which the throttle opening is smaller than a predetermined value while the throttle modulator pressure Psm is lower than the throttle pressure Pth in the range in which the throttle opening is larger than the predetermined value. When the throttle modulator pressure Psm is applied to the regulator valve 51 by way of the line 102, the line pressure assumes a value proportional to the throttle modulator pressure Psm and the line pressure Pln corresponding to the input torque of the transmission can be thus obtained.

The operation of the throttle modulator valve 65 when the governor pressure Pg from the line 104 changes with the throttle pressure Pth fixed will be described, hereinbelow.

The governor pressure Pg acts as a force urging rightward the first spool 65b but when the governor pressure Pg is low, the first spool 65b is held at the leftmost position under the spring force (the difference between the force F2 of the second spring 65f and the force F1 of the first spring 65e). When the governor pressure Pg is increased to overcome the spring force (Pg1 in FIG. 5), the first spool 65b is moved rightward according to the value of the governor pressure Pg, whereby the force F1 of the first spring 65e is enhanced and the throttle modulator pressure Psm is lowered irrespective of the fixed throttle pressure Pth. When the governor pressure Pg is further increased and reaches a predetermined value Pg2, the first spool 65b is brought into abutment against the second sleeve 65c and the further rightward movement of the first spool 65b is prevented. Accordingly, the throttle modulator pressure Psm is fixed even if the governor pressure Pg is further increased. The relation between the governor pressure Pg and the throttle modulator pressure Psm when the throttle pressure Pth is fixed is shown in FIG. 5. The governor pressure Pg is a hydraulic pressure which changes with the transmission output speed, i.e., the vehicle speed. When the throttle pressure Pth changes, the governor pressure-throttle modulator pressure characteristic curve shown in FIG. 5 moves up (in the direction of B) and down (in the direction of C). That is, as the throttle pressure Pth increases, i.e., as the throttle opening increases, the characteristic curve moves upward, and vice versa. Thus, the line pressure Pln proportional to the throttle modulator pressure Psm can be controlled with change of the transmission input torque.

As can be understood from the description above, by use of the throttle modulator valve 65, the line pressure can be regulated with change of the throttle opening and change of the vehicle speed so that the torque capacities of the brakes and clutches in the automatic transmission become an optimal value without substantially complicating the structure of the system.

Figure 2:
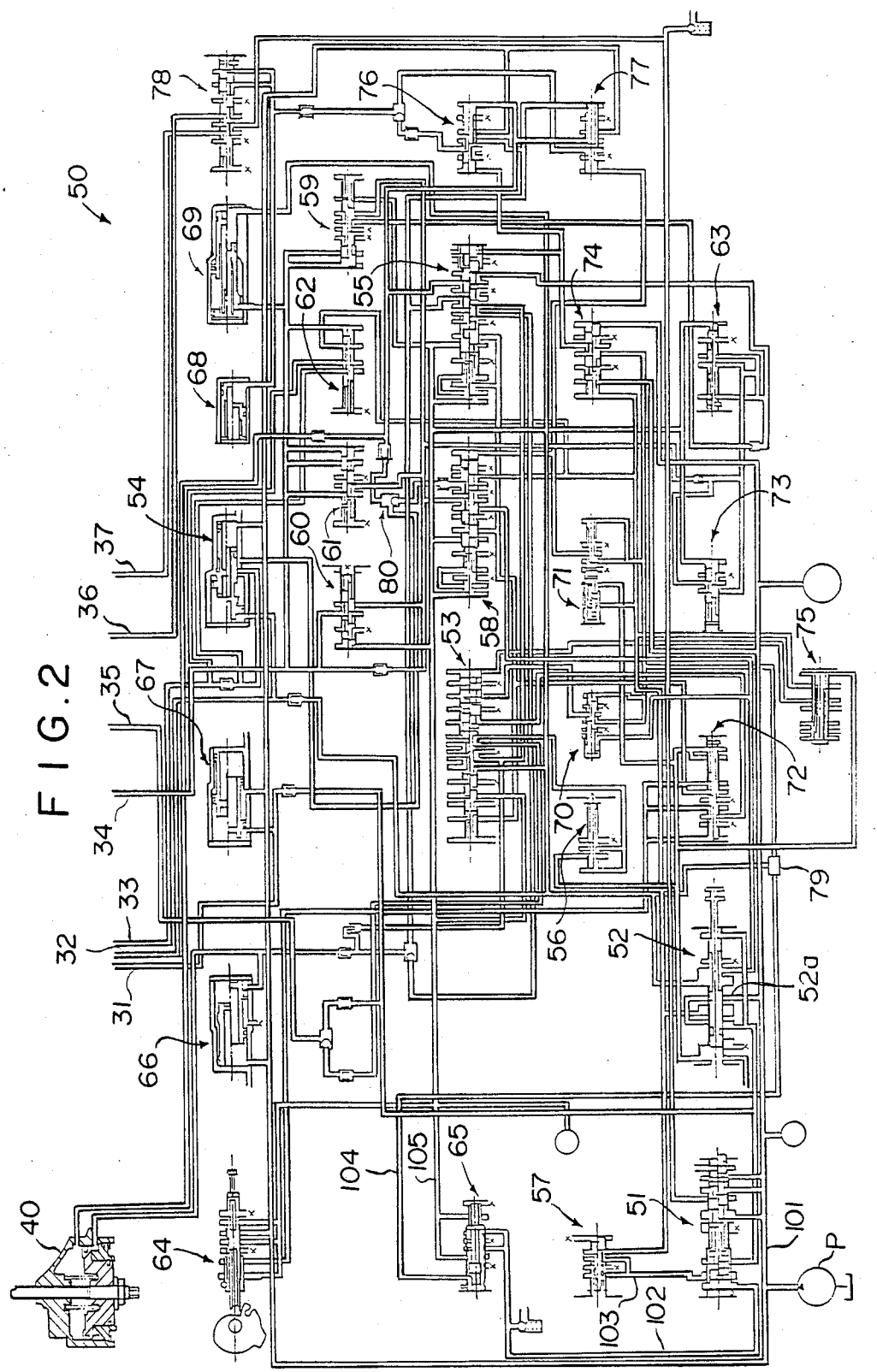
FIG. 2 is a view showing the hydraulic control circuit of the transmission shown in FIG. 1.

The line pressure thus regulated is selectively fed to the valves in the hydraulic control circuit 50 shown in FIG. 2 in response to operation of the manual shift valve 52. The valves receive the throttle pressure Pth and the governor pressure Psm and operates to selectively feed the line pressure to the lines 31 to 35 to actuate selected brakes and clutches according to the vehicle speed and the throttle opening. The operation of the hydraulic control circuit 50 is well known and accordingly will not be described in detail here.

The names and functions of the valves will be briefly described, hereinbelow.

A throttle backup valve 57 is for optimizing the operation in 1-range or 2-range, a 1-2 shift valve 53 is for automatic shifting between first and second, a 2-3 shift valve 58 is for automatic shifting between second and third, and a 3-4 shift valve 55 is for automatic shifting between third and fourth. A low-reducing valve 56 is for restraining shifting shock when the transmission downshifts from second to first in 1-range, a 2-3 shift timing valve 60 is for controlling the timing to upshift from second to third, a bypass valve 61 is for quickening build-up of the engaging pressure of 3-4 clutch upon upshifting from second to third, a coasting bypass valve 62 is for controlling the timing for a clutch to engage, a 3-2 capacity valve 63 is for controlling the capacity of 2-4 brake upon downshifting from third to second in 2-range, and a 3-2 timing valve 73 is for controlling the timing to downshift from third to second in 2-range. An N-D accumulator 54 for restraining shock when the selector lever is moved from N-range to D-range, an N-R accumulator 67 for restraining shock when the selector lever is moved from N-range to R-range, a 1-2 accumulator 66 is for restraining shifting shock when the transmission upshifts from first to second, and a 2-3 accumulator 69 is for restraining shifting shock when the transmission upshifts from second to third. A lockup control valve 78 is for controlling the operation of the lockup clutch of the torque converter, a servo control valve 59 is for controlling the timing to upshift from second to third, and a kick-down valve 72 is for shifting down the transmission when the accelerator pedal is abruptly pushed down by a large amount.

We claim:

1. A line pressure control system for an automatic transmission which has a transmission gear mechanism for transmitting the engine output power by way of a plurality of power transmission paths, and friction engagement elements which are operated by a line pressure from a control valve to change the power transmission path through the transmission gear mechanism, and in which the feed of the line pressure is controlled by a throttle pressure corresponding to the engine load and a governor pressure corresponding to the output speed of the transmission gear mechanism to effect gear shifting, the line pressure control system comprising a regulator valve for regulating the line pressure, and a throttle modulator valve for determining a throttle modulator pressure for controlling the regulator valve according to the governor pressure and the throttle pressure so that the line pressure is increased with increase of the throttle pressure and is lowered with increase of the output speed of the transmission gear mechanism; said throttle modulator valve comprising first and second spools, a first spring disposed between the first and second spools to urge the second spool in one direction, and the first spool in an opposite direction and a second spring for urging the second spool in the direction opposite to said one direction, said first spool includes a governor pressure receiving surface for controlling the throttle modulator pressure so that the line pressure decreases as the governor pressure increases, and said second spool has a throttle pressure receiving surface for controlling the throttle modulator pressure so that the line pressure increases as the throttle pressure increases.

2. A line pressure control system as defined in claim 1 in which said first spool is provided with a governor pressure receiving surface on which the pressure acts in the direction opposite to the direction in which the first spring urges the first spool; the governor pressure receiving surface being disposed opposite to the second spool.

3. A line pressure control system as defined in claim 2 in which said second spool is provided with a first pressure receiving surface on which the throttle pressure acts in an opposite direction to said one direction and a second pressure receiving surface on which the throttle modulator pressure acts in said one direction opposite to the direction in which the throttle pressure acts on the first pressure receiving surface.

4. A line pressure control system as defined in claim 3 in which said second spool is provided with a groove which communicates a hydraulic line for transmitting the throttle pressure with the hydraulic line for transmitting the throttle modulator pressure when the throttle pressure is not higher than a predetermined value.

5. A line pressure control system as defined in claim 4 in which said throttle modulator valve increases the throttle modulator pressure at a rate substantially equal to the increasing rate of the throttle pressure when the throttle pressure is not higher than the predetermined value, and increases the throttle modulator pressure at a rate lower than the increasing rate of the throttle pressure when the throttle pressure is higher than the predetermined value.

6. A line pressure control system as defined in claim 1 in which the force of said first spring is weaker than that of the second spring.

7. A line pressure control system as defined in claim 6 in which said first spool is provided with a pressure receiving surface on which the governor pressure acts in the direction opposite to the direction in which the second spring urges the second spool, and said second spool is provided with a first pressure receiving surface on which the throttle modulator pressure acts in an opposite direction to said one direction and a second pressure receiving surface on which the throttle pressure acts in said one direction opposite to the direction in which the throttle modulator pressure acts on the first pressure receiving surface, the first pressure receiving surface being larger in area than the second pressure receiving surface.

8. A line pressure control system as defined in claim 7 in which said second spool is provided with a groove which communicates a hydraulic line for transmitting the throttle pressure with the hydraulic line for transmitting the throttle modulator pressure when the throttle pressure is not higher than a predetermined value.

9. A line pressure control system as defined in claim 6 in which said second spool of said throttle modulator valve includes means connected to the throttle pressure and the throttle modulator pressure at a rate lower than the increasing rate of the throttle pressure when the throttle pressure is higher than a predetermined value.

10. A line pressure control system as defined in claim 9 wherein said governor pressure receiving surface of said first spool of said throttle modulator valve determines the throttle modulator pressure to be constant at a first predetermined value when the governor pressure is lower than a first predetermined pressure, which corresponds to the difference between the force of the second spring and the force of the first spring, when the governor pressure is increased above said first predetermined pressure the throttle modulator pressure is lowered by said throttle modulator valve to a second predetermined value with the increase of the governor pressure up to a second predetermined pressure higher than the first predetermined pressure, and said throttle modulator valve includes means to fix the second predetermined value of the throttle modulator pressure when the governor pressure is equal to or higher than the second predetermined pressure, the second predetermined pressure being the governor pressure at which the first spool is brought into abutment against the second spool.

11. A line pressure control system for an automatic transmission which has a transmission gear mechanism for transmitting the engine output power by way of a plurality of power transmission paths, and friction engagement elements which are operated by a line pressure from a control valve to change the power transmission path through the transmission gear mechanism, and in which the feed of the line pressure is controlled by a throttle pressure corresponding to the engine load and a governor pressure corresponding to the output speed of the transmission gear mechanism to effect gear shifting, the line pressure control system comprising a regulator valve for regulating the line pressure, and a throttle modulator valve for determining a throttle modulator pressure for controlling the regulator valve according to the governor pressure and the throttle pressure so that the line pressure is increased with increase of the throttle pressure and is lowered with increase of the output speed of the transmission gear mechanism; said throttle modulator value includes a governor pressure receiving surface for controlling the throttle modulator pressure so that the line pressure decreases as the governor pressure increases, and a throttle pressure receiving surface for controlling the throttle modulator pressure so that the line pressure increases as the throttle pressure increases;

said governor pressure receiving surface of said throttle modulator valve determines the throttle modulator pressure to be constant at a first predetermined value irrespective of the governor pressure when the governor pressure is lower than a first predetermined pressure, which corresponds to the difference between the force of the second spring and the force of the first spring, when the governor pressure is increased above said first predetermined pressure the throttle modulator pressure is lowered by said throttle modulator valve to a second predetermined value with the increase of the governor pressure up to a second predetermined pressure higher than the first predetermined pressure, said throttle modulator valve including means to fix the second predetermined value of the throttle modulator pressure irrespective of the governor pressure when the governor pressure is equal to or higher than the second predetermined pressure.

12. A line pressure control system as defined in claim 11 in which said first and second predetermined values of the throttle modulator pressure are increased as the throttle pressure is increased by the throttle pressure on the throttle pressure receiving surface.

13. A line pressure control system as defined in claim 11 in which said throttle modulator valve includes means connected to the throttle pressure and the throttle modulator pressure for increasing the throttle modulator pressure as a rate substantially equal to the increasing rate of the throttle pressure when the throttle pressure is not higher than the predetermined value, and increases the throttle modulator pressure at a rate lower than the increasing rate of the throttle pressure when the throttle pressure is higher than the predetermined value.

* * * * *